Oct. 27, 1936.　　G. L. STURDEVANT　　2,059,056
AUTOMOBILE SEAT CONSTRUCTION
Filed July 23, 1935　　2 Sheets-Sheet 1
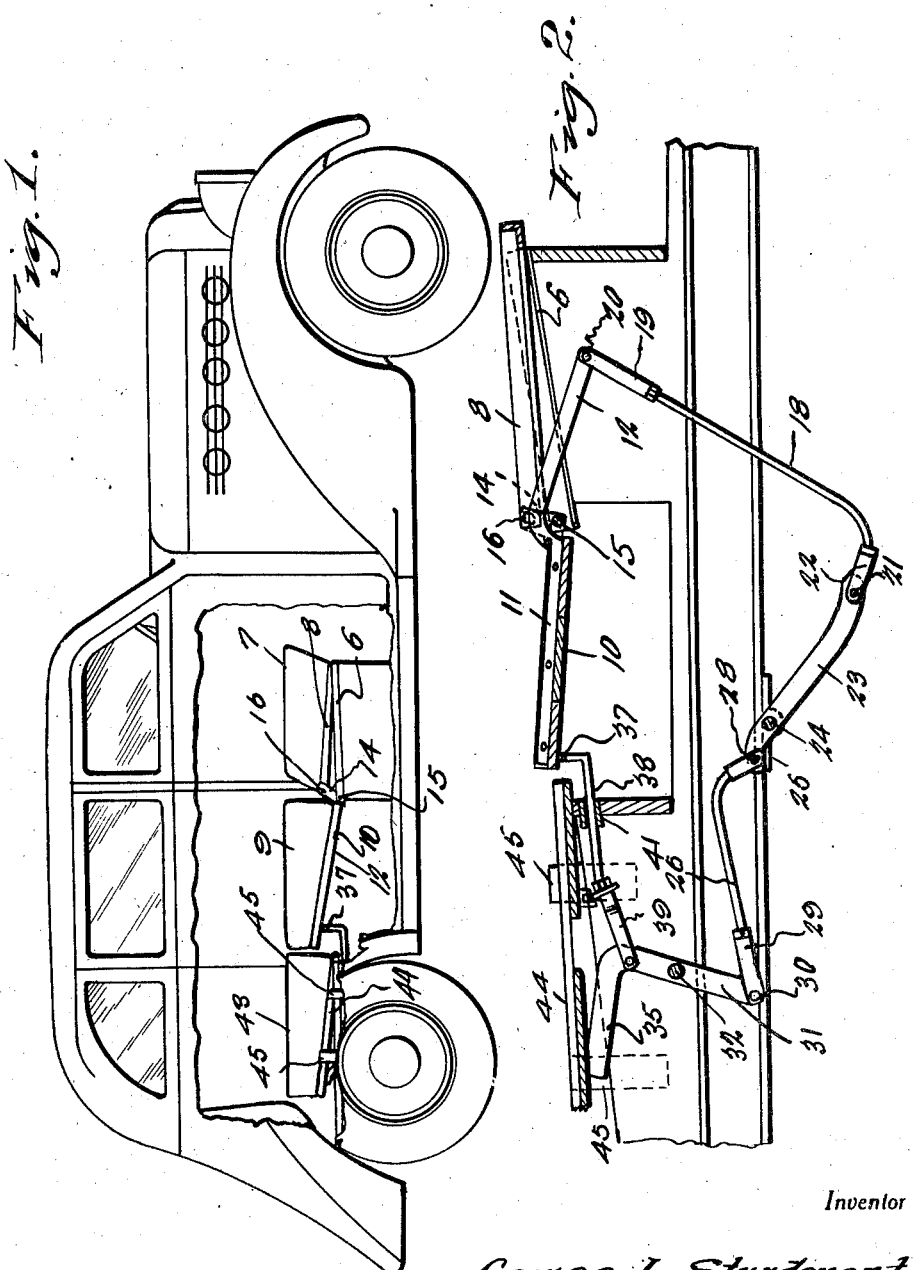
Inventor
George L. Sturdevant
By Clarence A. O'Brien
Attorney Oct. 27, 1936.   G. L. STURDEVANT   2,059,056
AUTOMOBILE SEAT CONSTRUCTION
Filed July 23, 1935   2 Sheets-Sheet 2
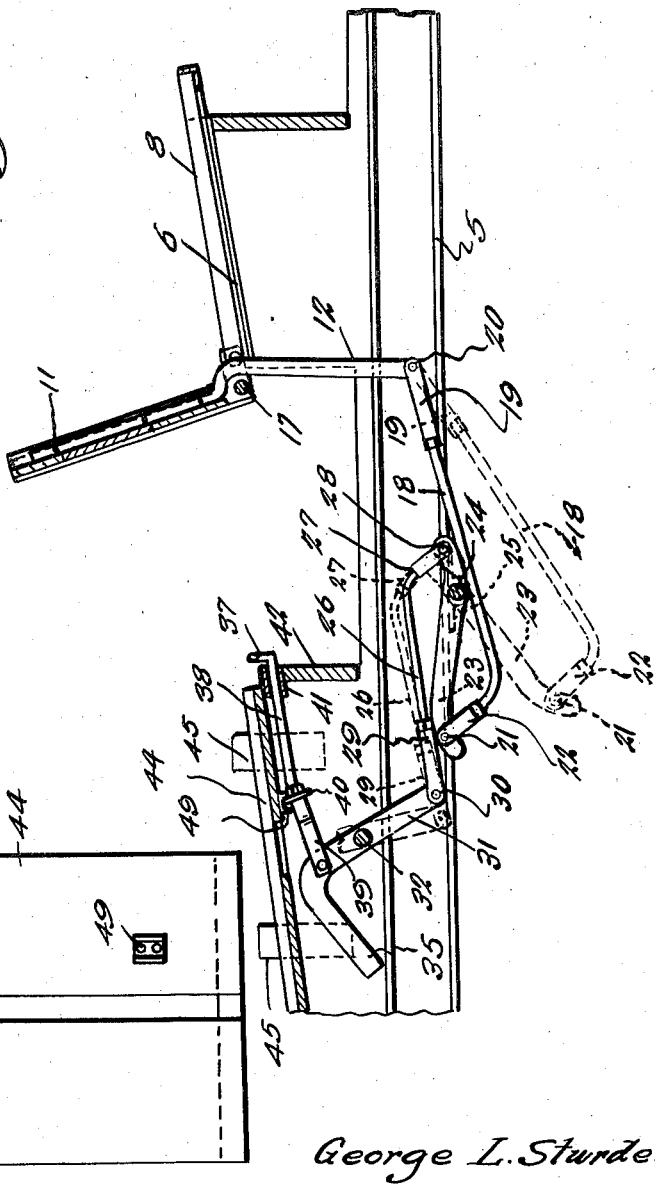
Inventor
George L. Sturdevant
By Clarence A. O'Brien
Attorney Patented Oct. 27, 1936

2,059,056

UNITED STATES PATENT OFFICE 2,059,056

AUTOMOBILE SEAT CONSTRUCTION

George L. Sturdevant, San Antonio, Tex., assignor of eighteen and three-fourths per cent to Bascom D. Talley and six and one-fourth per cent to Harry H. Richardson, both of Bogalusa, La.

Application July 23, 1935, Serial No. 32,799

1 Claim. (Cl. 155—7)

The present invention relates to the construction of seats in a sedan type automobile and the object of the invention resides in the provision of means whereby the back cushion of the front seat assembly may be swung to a substantially horizontal position so as to be disposed between the front seat cushion and the back seat cushion to form a bed and means whereby simultaneously the front and back cushions are adjusted so as to provide a relatively level or smooth sleeping surface.

Another important object of the invention resides in the provision of a seating structure of this nature the operating means of which is comparatively simple in its construction, inexpensive to manufacture and install, easy to operate, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed;

In the drawings:

Figure 1 is a view showing the seating arrangement adjusted to provide a bed.

Figure 2 is a detail longitudinal sectional view through the seating arrangement with the upholstering removed showing the seating arrangement in a bed forming position.

Figure 3 is a detail longitudinal sectional view through the seating arrangement with the back of the front seat in locked upright position.

Figure 4 is a bottom plan view of the frame of the bottom cushion of the back seat.

Referring to the drawings in detail it will be seen that the numerals 5—5 denote the side rails of the automobile chassis. Numeral 6 denotes the supporting structure for the bottom of the front seat. The said bottom of the front seat is denoted generally by the numeral 7. The numeral 8 denotes the frame thereof on which the upholstery is mounted in the usual well-known manner, the frame 8 normally resting in the supporting structure 6. The numeral 9 denotes the back of the front seat, the upholstery of which is on the frame 10. Secured to the sides of this frame 10 is a pair of rods 11 having arm extensions 12. Also on the sides of this frame 10 are bars 13 having relatively short right angular extensions 14 at their lower ends. In the junctures of the bars and extensions there are provided openings 15. An opening 16 is provided in the extremity of each of the extensions 14. A pivot pin 17 extends through the openings 15 and is mounted in the front seat supporting structure 6 whereby it will be seen the back 9 is swingable with respect to the seat 7 from the ordinary upright position to the substantially horizontal position shown in Figure 1.

A pair of links 18 having yokes 19 pivotally engaged as at 20 with arms 12 and also yokes 21 pivotally engaged as at 22 with levers 23. The levers 23 are fixed intermediate their ends on a shaft 24 journaled through bearings 25 fixed in the rails 5 below the space between the front and back seats. Links 26 have yokes 27 pivotally engaged as at 28 with the other ends of the levers 23 and are also provided with yokes 29 pivotally engaged as at 30 with levers 31. The levers 31 are rockable intermediate their ends on a rod 32 extending between the rails 5. The upper ends of the levers 31 are provided with rearwardly and angularly disposed extensions 35. A substantially U-shaped rod includes a cross member 36 merging at its ends into short depending extensions 37 which in turn merge into rearwardly extending legs 38. Yokes 39 are threadedly engaged on the extremities of the legs 38 and hold in place lugs 40. The legs 38 are slidable through sleeves 41 mounted in the front board 42 of the back seat support. Numeral 43 denotes the back rest of the back seat, the upholstery of which is on a frame 44 receivable in the usual supporting structure 45. One end of the shaft 24 extends to the outside of one of the rails 5 and is square so that a crank may be engaged therein for turning the shaft.

It should be noted that the cushion of the front seat slants downwardly and rearwardly as also does the cushion of the back seat and it will be noted that the cushion of the back of the front seat decreases in depth upwardly. It is my purpose with the apparatus just described to place the front seat cushion, the back of the front seat cushion and the back seat cushion so that the upper surfaces thereof will be in a substantially smooth horizontal plane as shown in Figure 1. This is accomplished by engaging a crank on the shaft 24 and turning it, referring to Figure 3 in a counter-clockwise direction and this will cause the various parts to assume the position shown in Figure 2. It will be noted that the bars 12 with the extensions 14 have raised the frame 8 so that the top surface of the cushion thereof is substantially horizontal. It will be noted that the back of the front seat rests on the cross member 36 so that the top of this cushion is substantially horizontal and it will be noted that the extensions 35 have raised the rear seat cushion so that the upper surface of this cushion is substantially horizontal. It will also be noted that the lugs 40 engaged in the cleats 49 under the rear seat have pushed this rear seat forwardly so as to be close to the normally top end of the back of the front seat.

When the back 9 is returned to its normal upright position, the operating mechanism assumes the position shown in dotted lines in Figure 3. The links 18 are then moved toward the shaft 24, as shown in full lines in the same figure, thereby raising the connections 22 and the levers 23 above the shaft. It is apparent from this construction that the back 9 is locked in its upright position, and is thereby prevented from assuming a horizontal position when pressure is exerted against it.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described the invention, what is claimed as new is:

In an automobile body of the class described, a front seat supporting structure, a rear seat supporting structure, a front seat bottom on the front seat supporting structure, a front seat back swingably mounted on the front seat supporting structure, a rear seat on the rear seat supporting structure, rods attached to the front seat back and having arm extensions disposed downwardly, links pivotally engaged therewith, a shaft journaled across the body, levers fixed to the shaft intermediate their ends, one end of each of the levers being pivotally connected with one of the links, links pivotally connected with the remaining ends of the levers, a second pair of levers, means for rockably mounting the second pair of levers intermediate their ends, the second mentioned links being pivotally engaged with the lower ends of the second pair of levers, the second pair of levers having angular extensions disposed in a rearward direction for engaging the bottom side of the back seat, a rod having lateral legs and a cross member, sleeves in the rear seat supporting structure for slidably mounting the legs, means for pivotally engaging the ends of the legs with the upper portions of the second mentioned levers, lugs on the legs, cleats under the rear seat bottom for engagement with the lugs whereby when the shaft is turned the back of the front seat may be lowered and the bottom of the rear seat advanced forwardly and the rear thereof elevated.

GEORGE L. STURDEVANT.